US011871206B2

(12) United States Patent
Taniwa

(10) Patent No.: US 11,871,206 B2
(45) Date of Patent: Jan. 9, 2024

(54) COMPUTER-READABLE NON-TRANSITORY STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Hiroyuki Taniwa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 173 days.

(21) Appl. No.: 17/693,963

(22) Filed: Mar. 14, 2022

(65) Prior Publication Data

US 2022/0295208 A1 Sep. 15, 2022

(30) Foreign Application Priority Data

Mar. 15, 2021 (JP) ................................ 2021-041184

(51) Int. Cl.
*H04S 7/00* (2006.01)
*G06F 3/16* (2006.01)

(52) U.S. Cl.
CPC ................ *H04S 7/30* (2013.01); *G06F 3/165* (2013.01)

(58) Field of Classification Search
None
See application file for complete search history.

(56) References Cited

U.S. PATENT DOCUMENTS

2004/0110561 A1 6/2004 Kawamura
2012/0106744 A1 5/2012 Kambe
2014/0126754 A1 5/2014 Mizuta
2014/0133681 A1* 5/2014 Mizuta .................... A63F 13/54 381/300
2018/0011681 A1 1/2018 Kada

FOREIGN PATENT DOCUMENTS

JP 2002-263371 9/2002
JP 2004-195210 7/2004
JP 2011-250311 12/2011
JP 6147486 6/2017
JP 2018-007175 1/2018
JP 2018-130282 8/2018

* cited by examiner

*Primary Examiner* — Kenny H Truong
(74) *Attorney, Agent, or Firm* — Nixon & Vanderhye PC

(57) ABSTRACT

In a case where a virtual microphone has moved to an extent greater than a predetermined reference in a virtual space, during a predetermined period from the movement of the virtual microphone, first interpolation for changing from a relative distance before the movement to a relative distance after the movement over the predetermined period, and second interpolation for changing from a relative direction before the movement to a relative direction after the movement over the predetermined period, are each performed. Then, the volume and the balance of sounds to be outputted are set on the basis of the relative distance by the first interpolation and the relative direction by the second interpolation.

20 Claims, 9 Drawing Sheets

FIG. 3
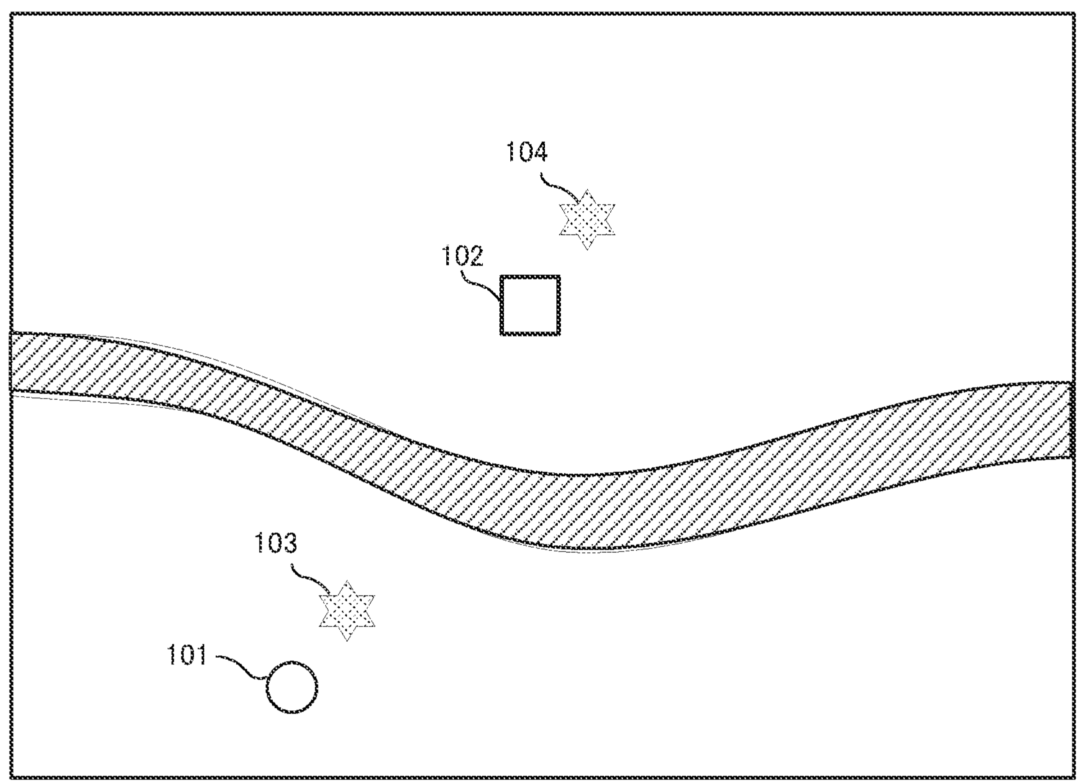
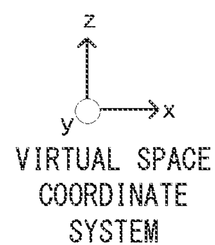

VIRTUAL SPACE COORDINATE SYSTEM

VIRTUAL SPACE COORDINATE SYSTEM

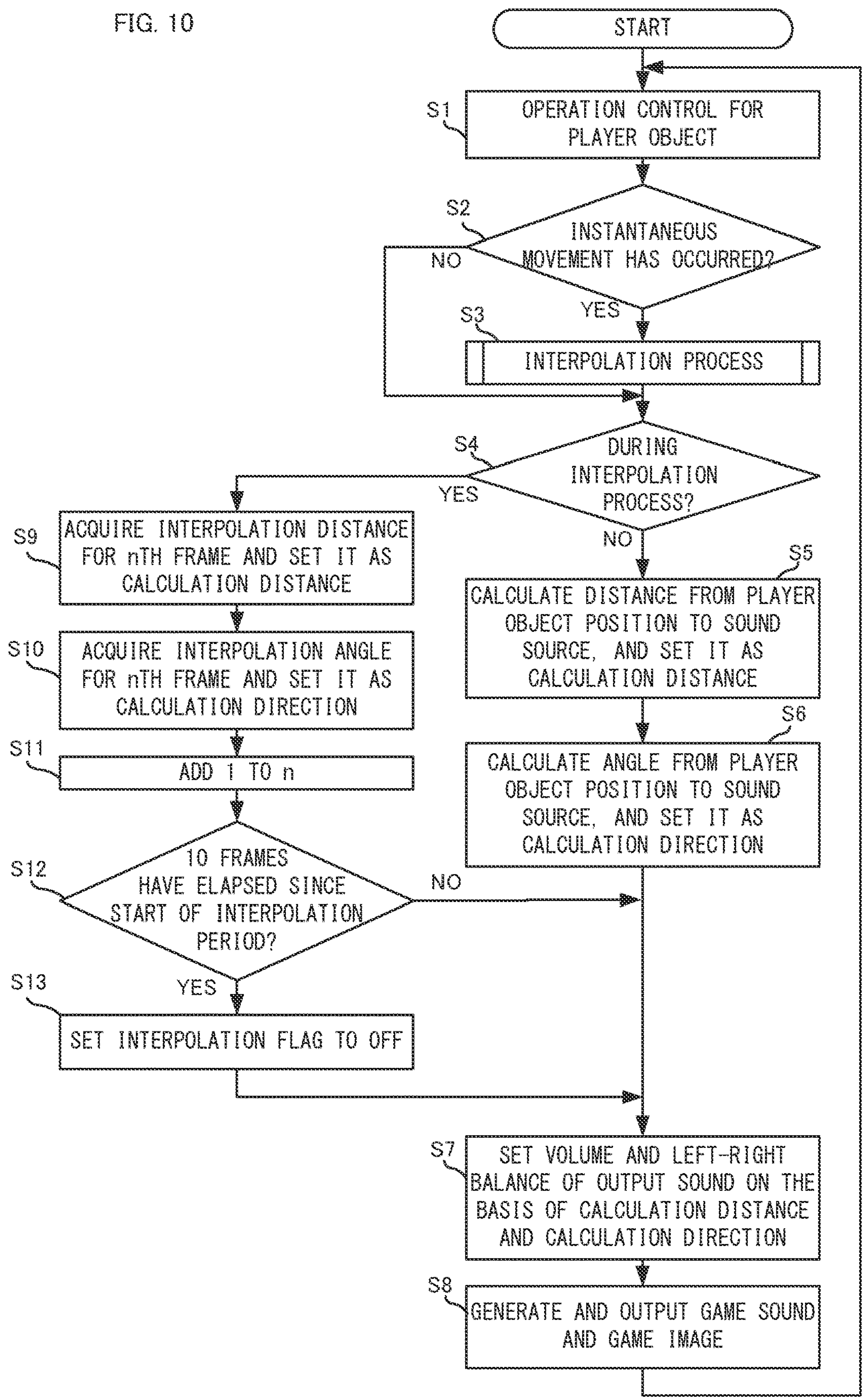
FIG. 10
START
S1
OPERATION CONTROL FOR PLAYER OBJECT
S2
INSTANTANEOUS MOVEMENT HAS OCCURRED?
NO
YES
S3
INTERPOLATION PROCESS
S4
DURING INTERPOLATION PROCESS?
YES
NO
S5
CALCULATE DISTANCE FROM PLAYER OBJECT POSITION TO SOUND SOURCE, AND SET IT AS CALCULATION DISTANCE
S6
CALCULATE ANGLE FROM PLAYER OBJECT POSITION TO SOUND SOURCE, AND SET IT AS CALCULATION DIRECTION
S9
ACQUIRE INTERPOLATION DISTANCE FOR nTH FRAME AND SET IT AS CALCULATION DISTANCE
S10
ACQUIRE INTERPOLATION ANGLE FOR nTH FRAME AND SET IT AS CALCULATION DIRECTION
S11
ADD 1 TO n
S12
10 FRAMES HAVE ELAPSED SINCE START OF INTERPOLATION PERIOD?
NO
YES
S13
SET INTERPOLATION FLAG TO OFF
S7
SET VOLUME AND LEFT-RIGHT BALANCE OF OUTPUT SOUND ON THE BASIS OF CALCULATION DISTANCE AND CALCULATION DIRECTION
S8
GENERATE AND OUTPUT GAME SOUND AND GAME IMAGE

COMPUTER-READABLE NON-TRANSITORY STORAGE MEDIUM HAVING INFORMATION PROCESSING PROGRAM STORED THEREIN, INFORMATION PROCESSING APPARATUS, INFORMATION PROCESSING SYSTEM, AND INFORMATION PROCESSING METHOD

CROSS REFERENCE TO RELATED APPLICATION

This application claims priority to Japanese Patent Application No. 2021-041184 filed on Mar. 15, 2021, the entire contents of which are incorporated herein by reference.

FIELD

The exemplary embodiments relate to sound control processing for outputting a sound to a plurality of speakers.

BACKGROUND AND SUMMARY

Conventionally, there has been known technology for controlling the volume, etc. of an output sound on the basis of the distance between a virtual sound source and a virtual microphone.

However, in the above technology, when the relative positional relationship between a listener (virtual microphone) and a sound source sharply changes, sharp change occurs in sound output, and this might make a user feel strange.

Accordingly, an object of the exemplary embodiments is to provide a computer-readable non-transitory storage medium having an information processing program stored therein, an information processing apparatus, an information processing system, and an information processing method that can relax sharp change in sound output even when the relative positional relationship between a listener and a sound source sharply changes.

Configuration examples for achieving the above object will be shown below.

One configuration example is a non-transitory computer-readable storage medium having stored therein an information processing program to be executed by a computer of an information processing apparatus capable of outputting a sound to a plurality of speakers. The program causes the computer to: control a position of a virtual microphone in a virtual space where a virtual sound source associated with a sound is placed; perform volume setting for the sound to be outputted and balance setting for an output balance of the plurality of speakers, on the basis of a relative distance and a relative direction from the virtual microphone to the virtual sound source; and output the sound to the plurality of speakers on the basis of the set volume and the set output balance. Here, in a case where the virtual microphone has moved to an extent greater than a predetermined reference in the virtual space, during a predetermined period from the movement of the virtual microphone, the program causes the computer to perform each of first interpolation for changing the relative distance over the predetermined period, from the relative distance before the movement to the relative distance after the movement, and second interpolation for changing the relative direction over the predetermined period, from the relative direction before the movement to the relative direction after the movement, and perform the volume setting and the balance setting on the basis of the relative distance set through the first interpolation and the relative direction set through the second interpolation.

According to the above configuration example, even when the relative positional relationship between the listener and the sound source sharply changes, sharp change in sound output can be relaxed.

In another configuration example, the first interpolation and the second interpolation may be linear interpolations.

According to the above configuration example, interpolation processing can be performed through simple processing, whereby the processing load can be reduced.

In another configuration example, the predetermined reference may be that a movement distance in a unit time reaches a predetermined distance in the virtual space.

According to the above configuration example, for example, even in a case where the virtual microphone has instantaneously moved a predetermined distance or longer in the virtual space, sharp change in sound output can be relaxed.

In another configuration example, the computer may be further caused to: control a virtual camera on the basis of an operation input; and control a position of the virtual microphone on the basis of a position of a look-at point of the virtual camera.

In another configuration example, the computer may be further caused to: control a player character object on the basis of the operation input; control the look-at point of the virtual camera on the basis of a position of the player character object; and when the player character object is at a position where a first object is placed in the virtual space, move the player character object to a position of a second object placed in the virtual space, on the basis of the operation input.

According to the above configuration example, even in a case where the relative positional relationship between the player object and the virtual sound source greatly changes, sharp change in sound output of the virtual sound source can be relaxed.

The exemplary embodiments make it possible to relax sharp change in sound output even when the relative positional relationship between a listener and a sound source sharply changes.

BRIEF DESCRIPTION OF THE DRAWINGS

FIG. 3 is a schematic view showing a non-limiting example of a virtual space as seen from above, according to an exemplary embodiment;

FIG. 10 is a non-limiting example of a flowchart showing the details of a game process according to the exemplary embodiment.

DETAILED DESCRIPTION OF NON-LIMITING EXAMPLE EMBODIMENTS

Hereinafter, one exemplary embodiment will be described. It is to be understood that as used herein, elements and the like written in a singular form with a word "a" or "an" attached before them do not exclude those in a plural form.

Figure 1:
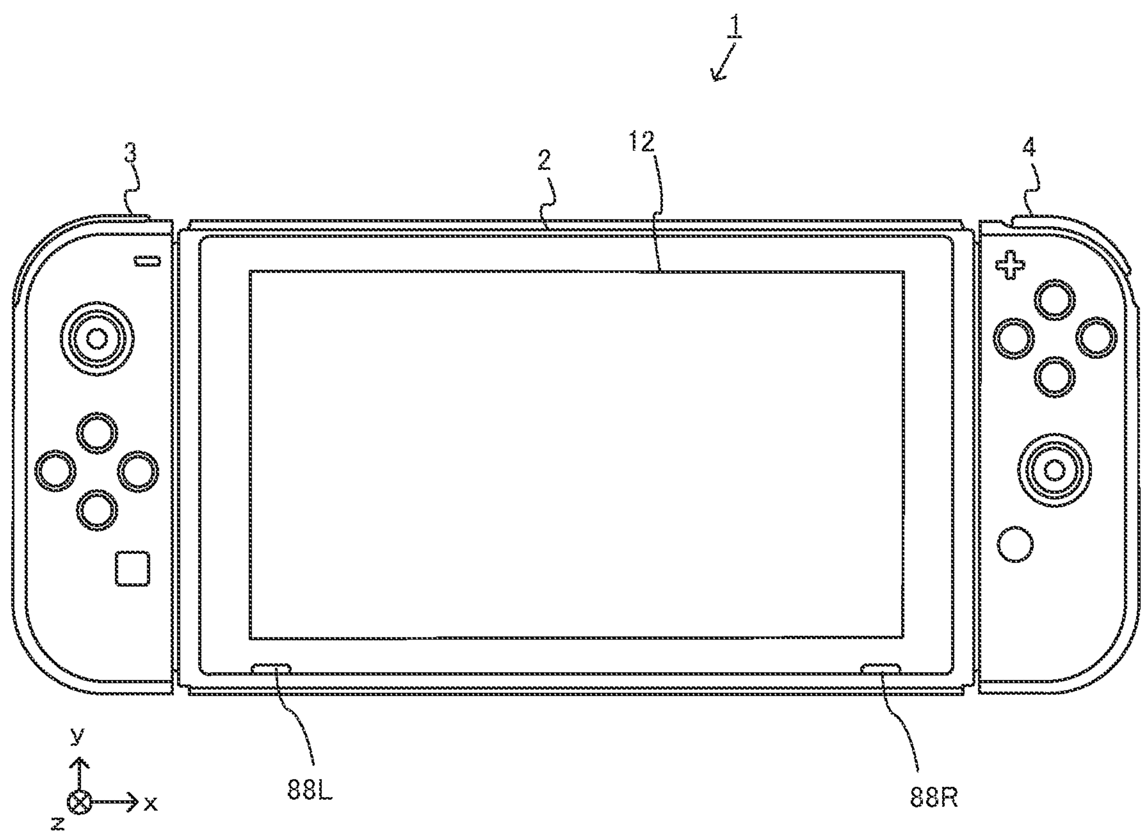
FIG. 1 shows a non-limiting example of a state in which a left controller 3 and a right controller 4 are attached to a main body apparatus 2.

First, an information processing system for executing information processing according to the exemplary embodiment will be described. In the exemplary embodiment, a game system will be described as an example of the information processing system. Although any game system may be employed, FIG. 1 shows, as an example, an external view of a game system used in the exemplary embodiment. A game system 1 shown in FIG. 1 includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies. FIG. 1 shows an example of a state in which the left controller 3 and the right controller 4 are attached to the main body apparatus 2. As shown in FIG. 1, the left controller 3 and the right controller 4 are attached to the main body apparatus 2 so as to be unified. The main body apparatus 2 is an apparatus that executes various types of processing (e.g., game processing) in the game system 1. The main body apparatus 2 is provided with a display 12, and a left speaker 88L and a right speaker 88R which are stereo speakers. The left controller 3 and the right controller 4 are devices having operation portions for a player to perform an input.

Figure 2:
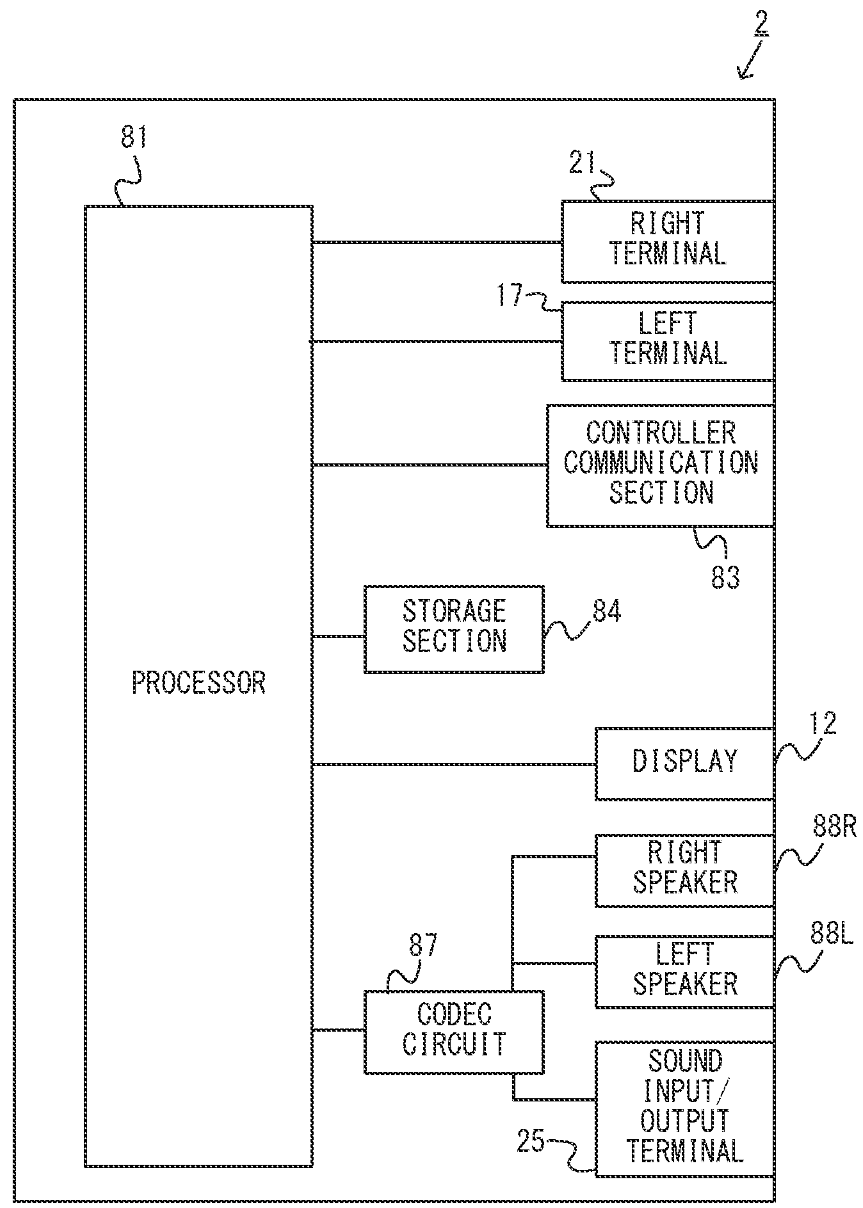
FIG. 2 is a block diagram showing a non-limiting example of the internal configuration of the main body apparatus 2.

FIG. 2 is a block diagram showing an example of the internal configuration of the body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section 84, thereby performing the various types of information processing. The storage section 84 may be an internal storage medium such as a flash memory or a dynamic random access memory (DRAM), or may be realized using, for example, an external storage medium mounted to a slot (not shown).

The main body apparatus 2 includes a controller communication section 83. The controller communication section 83 is connected to the processor 81. The controller communication section 83 wirelessly communicates with the left controller 3 and/or the right controller 4, when the body apparatus 2, and the left controller 3 and right controller 4, are used separately from each other. The communication method between the main body apparatus 2, and the left controller 3 and the right controller 4, is optional. In the exemplary embodiment, the controller communication section 83 performs communication compliant with the Bluetooth (registered trademark) standard with the left controller 3 and with the right controller 4.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87, the left speaker 88L, and the right speaker 88R. The codec circuit 87 is connected to the left speaker 88L, the right speaker 88R, and a sound input/output terminal 25, and also connected to the processor 81. The codec circuit 87 is a circuit for controlling input and output of sound data to and from the left speaker 88L, the right speaker 88R, and the sound input/output terminal 25.

Although not shown, an image or a sound generated in the main body apparatus 2 can be outputted to an external monitor or an external speaker via a predetermined output terminal.

[Controller]

Although not shown, the left controller 3 and the right controller 4 each include a communication control section for performing communication with the main body apparatus 2. In a state in which the left controller 3 and the right controller 4 are attached to the main body apparatus 2, wired communication can be performed via the left terminal 17 and the right terminal 21. On the other hand, in the case where the main body apparatus 2, and the left controller 3 and the right controller 4, are used separately from each other, it is possible to perform wireless communication with the main body apparatus 2 not via the terminals. The communication control section acquires information about an input (specifically, information about an operation) from each of input portions of the controllers. Then, the communication control section transmits operation data including the acquired information (or information obtained by performing predetermined processing on the acquired information), to the main body apparatus 2. It is noted that the operation data is repeatedly transmitted at intervals of once every predetermined time. It is noted that the intervals at which the information about an input is transmitted to the main body apparatus 2 may be the same among the input portions, or may be different thereamong.

[Outline of Processing in Exemplary Embodiment]

Next, the outline of processing operation in the exemplary embodiment will be described. Processing assumed in the exemplary embodiment is mainly processing for sound control. Specifically, processing is executed so that, in a virtual three-dimensional space (hereinafter, simply referred to as virtual space), when the positional relationship between a virtual microphone and a virtual sound source sharply and greatly changes, an auditory strange feeling which might be given to a user between before and after the change is reduced.

FIG. 3 shows an example of the positional relationship between the virtual microphone and the virtual sound source in the virtual space, assumed in the following description of the processing in the exemplary embodiment. FIG. 3 is a schematic view of the virtual space as seen from above. In FIG. 3, a player character object (hereinafter, player object) 101, a virtual sound source (hereinafter, simply referred to as sound source) 102, a first warp point 103, and a second warp point 104 are shown.

The player object 101 is a target object to be operated by a user. The player object 101 can move in the virtual space on the basis of a movement operation by the user. The player object 101 also serves as a virtual microphone (listener). That is, a virtual microphone (not shown) is also placed in accordance with the position of the player object 101.

In the exemplary embodiment, a game screen is displayed as a three-dimensional image based on a third-person view. The look-at point of the virtual camera is set at the position of the player object 101. When the player object 101 moves, the virtual camera is controlled so that the look-at point follows the player object 101.

The sound source 102 is an object associated with predetermined sound data. The sound source 102 outputs a sound based on the sound data in the virtual space.

The first warp point 103 and the second warp point 104 are kinds of movement means in the virtual space. The positions where the first warp point 103 and the second warp point 104 are present are separate from each other by a predetermined distance or longer in the virtual space. When the player object 101 moves to the position of the first warp point 103 and is placed on the first warp point 103, the player object 101 can move to the position of the second warp point 104 substantially instantaneously (e.g., in a time of one frame). Conversely, the player object 101 can also move from the position of the second warp point 104 to the position of the first warp point 103. That is, using warp points enables the player object 101 to move a predetermined distance that the player object 101 cannot move at a normal movement speed, in a predetermined unit time. In the exemplary embodiment, the predetermined distance is such a distance that how the sound is heard sharply changes unless processing described in the exemplary embodiment is applied. Hereinafter, such movement that a movement distance in a predetermined unit time is a predetermined distance or longer in the virtual space is referred to as "instantaneous movement". For simplifying description, in the exemplary embodiment, it is assumed that such instantaneous movement that the movement distance is shorter than the predetermined distance does not occur.

Figure 4:
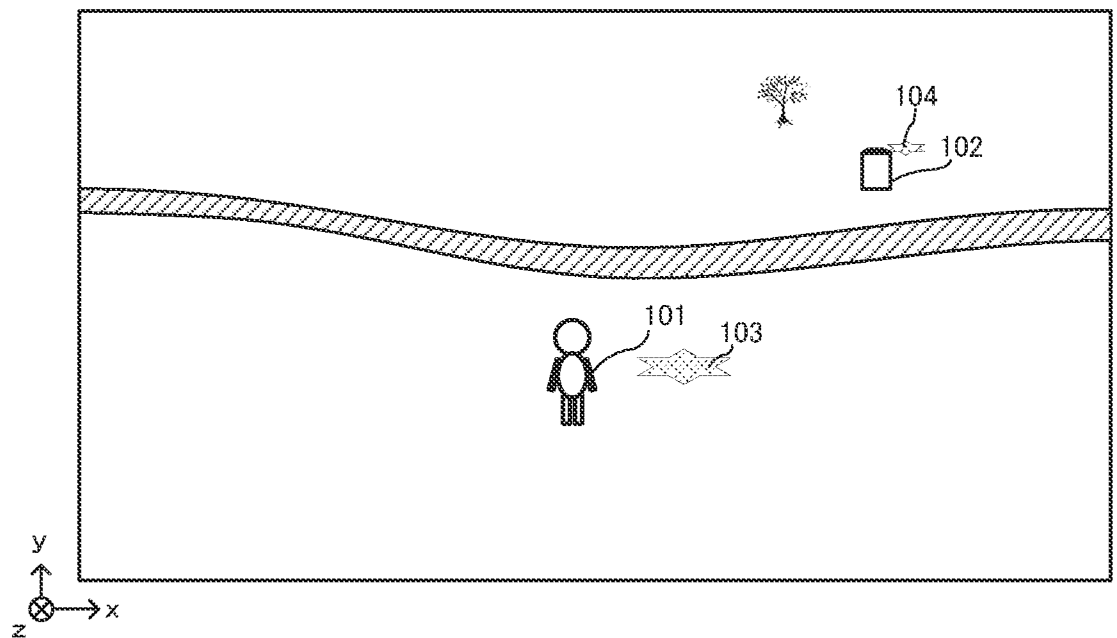
FIG. 4 shows a non-limiting example of a game screen according to the exemplary embodiment.
Figure 5:
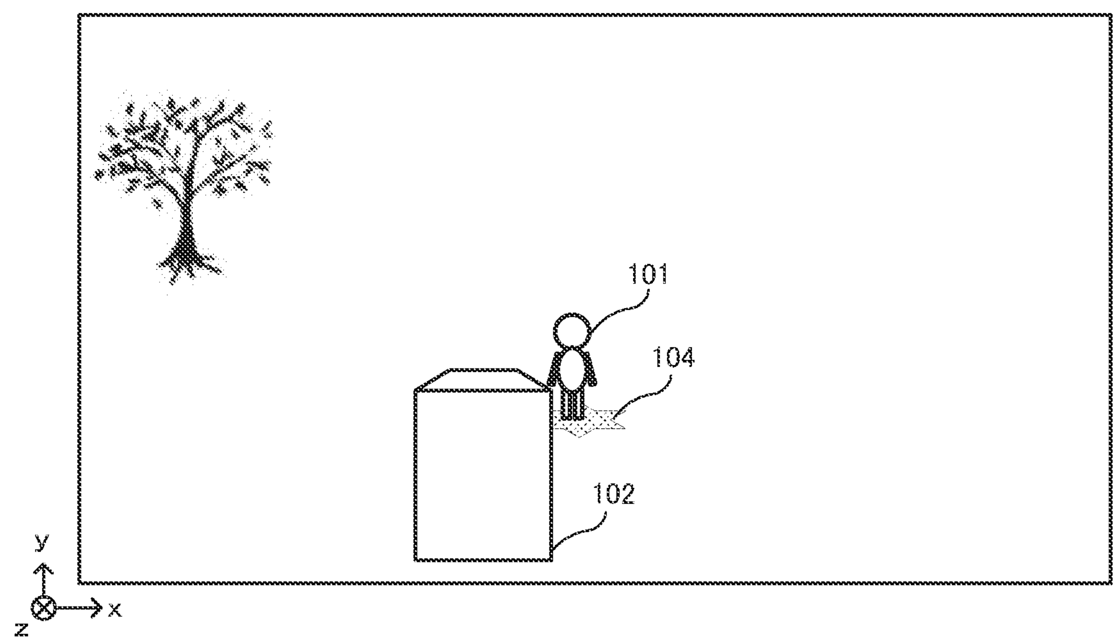
FIG. 5 shows a non-limiting example of a game screen according to the exemplary embodiment.

FIG. 4 and FIG. 5 show examples of game screens before and after the instantaneous movement. In FIG. 4, the first warp point 103 is displayed obliquely at the right front as seen from the player object 101. Further, the sound source 102 is displayed at a position which is also obliquely at the right front as seen from the player object 101 and is farther than the first warp point 103. In addition, the second warp point 104 is displayed backward of the sound source 102.

In the state shown in FIG. 4, when the player object 101 moves to be on the first warp point 103, the player object 101 instantaneously moves to the position of the second warp point 104, so that the screen as shown in FIG. 5 is displayed. In FIG. 5, the sound source 102 is displayed near the player object 101 and obliquely at the left back of the player object 101. That is, in the positional relationship between the player object 101 and the sound source 102, the position of the sound source 102 as seen from the player object 101 changes (substantially instantaneously) from a far position obliquely at the right front to a position obliquely at the left back near the player object 101. In other words, the relative distance (hereinafter, referred to as sound source distance) from the player object 101 to the sound source 102, and the relative direction (hereinafter, referred to as sound source direction) in which the sound source 102 is present as seen from the player object 101, sharply change between before and after the instantaneous movement.

Here, in a case where such sharp change in the positional relationship occurs while a sound is being outputted from the sound source 102, how the sound from the sound source 102 is heard also sharply changes, and this might give an auditory strange feeling to the user. For example, it is assumed that processing for blurring a sound in accordance with a distance is performed as sound effect processing. In this case, when the distance between the sound source 102 and the player object 101 sharply changes as described above, unnatural effect processing might be performed such that a sound heard in a blurred manner suddenly starts to be heard clearly, for example. As a result, the user might feel strange.

Accordingly, in the exemplary embodiment, even if sharp change occurs in the relative positional relationship between the player object 101 (virtual microphone) and the sound source 102 as described above while a sound is being outputted, the following control processing is performed to reduce the auditory strange feeling given to the user.

Figure 6:
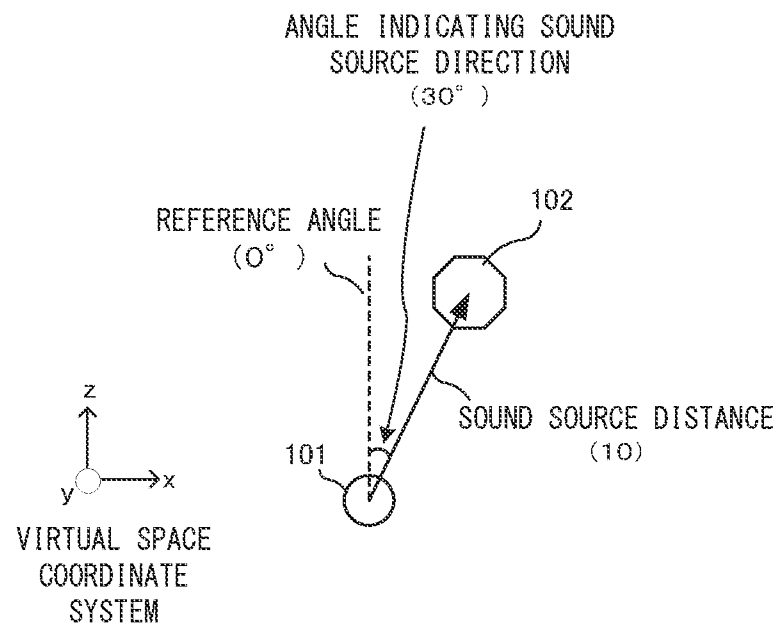
FIG. 6 illustrates a non-limiting example of the principle of control in the exemplary embodiment.
Figure 7:
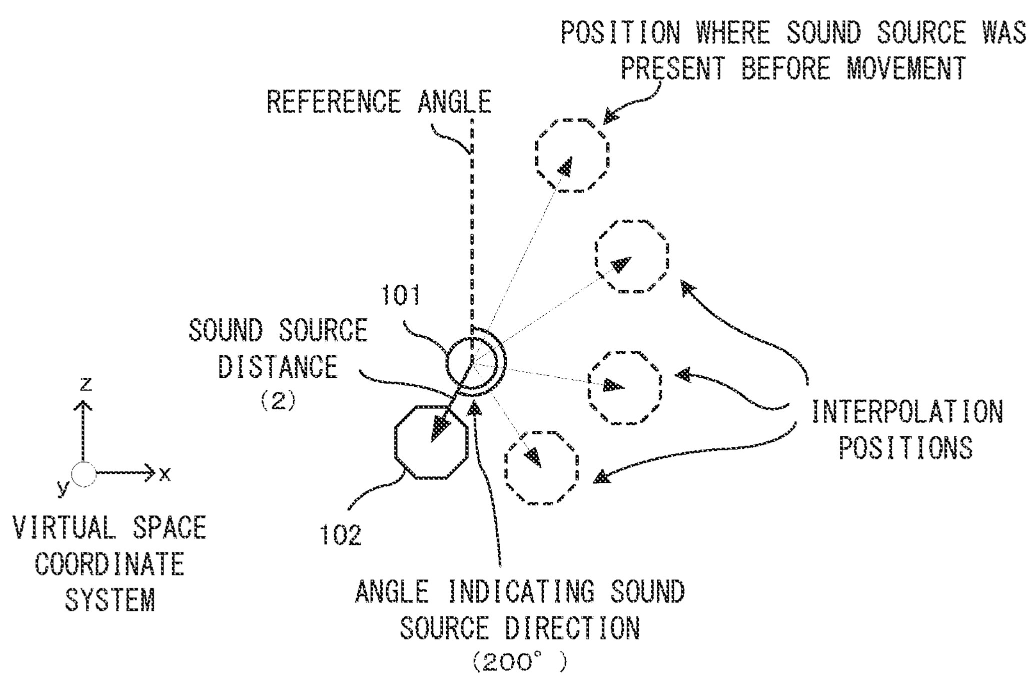
FIG. 7 illustrates a non-limiting example of the principle of control in the exemplary embodiment.

Next, the principle of control in the exemplary embodiment will be described. FIG. 6 and FIG. 7 illustrate the principle of sound control in the exemplary embodiment. FIG. 6 is a schematic view showing the relative positional relationship between the player object 101 and the sound source 102 before the instantaneous movement (corresponding to the state in FIG. 4). In FIG. 6, the sound source 102 is present at the upper right of the player object 101 (obliquely at the right front in a virtual space coordinate system). Here, the sound source distance is represented as the length of a straight line connecting the center points of the player object 101 and the sound source 102. In the example in FIG. 6, the sound source distance is assumed to be 10. In the description in the exemplary embodiment, the sound source direction is defined as "angle". Specifically, the positive direction of a z-axis in the virtual space coordinate system is defined as a reference angle of 0°, and the sound source direction is represented by an angle in a range of 360° clockwise. In the example in FIG. 6, the sound source 102 is present in a direction of 30° as seen from the player object 101.

Next, FIG. 7 is a schematic view showing the relative positional relationship between the player object 101 and the sound source 102 after the instantaneous movement (corresponding to the state in FIG. 5). In FIG. 7, the sound source 102 is present at the lower left of the player object 101 (obliquely at the left back in the virtual space coordinate system). In FIG. 7, the sound source distance is 2, and the sound source direction is a direction of 200°.

In the exemplary embodiment, when the instantaneous movement is performed, interpolation is performed for the position of the sound source 102 before and after the instantaneous movement. Specifically, first interpolation is performed so as to make gradual change over a predetermined period (hereinafter, referred to as interpolation period) from the sound source distance before the movement to the sound source distance after the movement. In addition, second interpolation is performed so as to make gradual change over the interpolation period from the sound source direction before the movement to the sound source direction after the movement. On the basis of the sound source distance and the sound source direction corresponding to these interpolations, for example, positions shown as "interpolation positions" in FIG. 7 can be calculated. As a result, sound expression can be made as if the sound source 102 moved through a track starting from the relative position where the sound source 102 was present before the instantaneous movement, curving clockwise through the interpolation positions, and then leading to the present relative position of the sound source 102. That is, during the interpolation period from when the instantaneous movement occurs, the volume of the output sound and the output balance between the right speaker 88R and the left speaker 88L are set under the assumption that the sound source 102 is present at the interpolation positions instead of the actual existing position of the sound source 102. In the following description, it is assumed that one second is processed with 30 frames and the interpolation period is a period of 10 frames.

An example of the way of the interpolation will be shown more specifically. First, for the sound source distance, the first interpolation is performed such that the sound source distance of 10 before the movement gradually changes to the sound source distance of 2 over 10 frames. In the example shown in FIG. 6 and FIG. 7, the interpolation is performed such that the difference (distance 8) between the sound source distances before and after the instantaneous movement is divided into 10 values, and the sound source distance is reduced by 0.8 per frame.

Similarly, also for the sound source direction (angle), the second interpolation is performed so as to make gradual change over 10 frames from the direction of 30° before the movement to the direction of 200° after the movement. In the example shown in FIG. 7, the interpolation is performed such that the difference (170°) between the sound source directions before and after the instantaneous movement is divided into 10 values, and the sound source direction (angle) is increased by 17° per frame.

Through such control, sound expression can be made as if the sound source 102 moved through a clockwise curving track around the player object 101 (a track passing the interpolation positions in FIG. 7) during the interpolation period, whereby sharp change in the sound output can be relaxed. Thus, it is possible to reduce an auditory strange feeling given to the user when the player object 101 (virtual microphone) instantaneously moves.

In the exemplary embodiment, the interpolation is performed so as to make a track curving around the player object 101 without making a straight line track simply connecting the relative positions of the sound source 102 before and after the instantaneous movement. The reason is as follows. If the interpolation is performed with a straight line track connecting the positions before and after the instantaneous movement (in other words, the interpolation is performed without considering the sound source distance and the sound source direction), in the case of FIG. 7, the track is made such that the sound source 102 passes the position of the player object 101. As a result, the positions of the player object 101 and the sound source 102 can overlap each other temporarily. At the timing of this overlap, the volume of the sound from the sound source temporarily becomes excessively large, thus ending up increasing a strange feeling given to the user. Therefore, in the exemplary embodiment, control is performed so as to perform interpolation for the sound source distance and the sound source direction separately from each other, thus making a curving track as described above.

In the above example in FIG. 7, the track is made such that the interpolation position curves in right turn (clockwise). However, the curving direction may be left turn (counterclockwise). In either case, the effect of reducing the strange feeling can be obtained, and therefore the curving direction may be set as appropriate in accordance with the game content or the like.

[Details of Game Process in Exemplary Embodiment]

Hereinafter, the game process in the exemplary embodiment will be described in more detail.

[Used Data]

Figure 8:
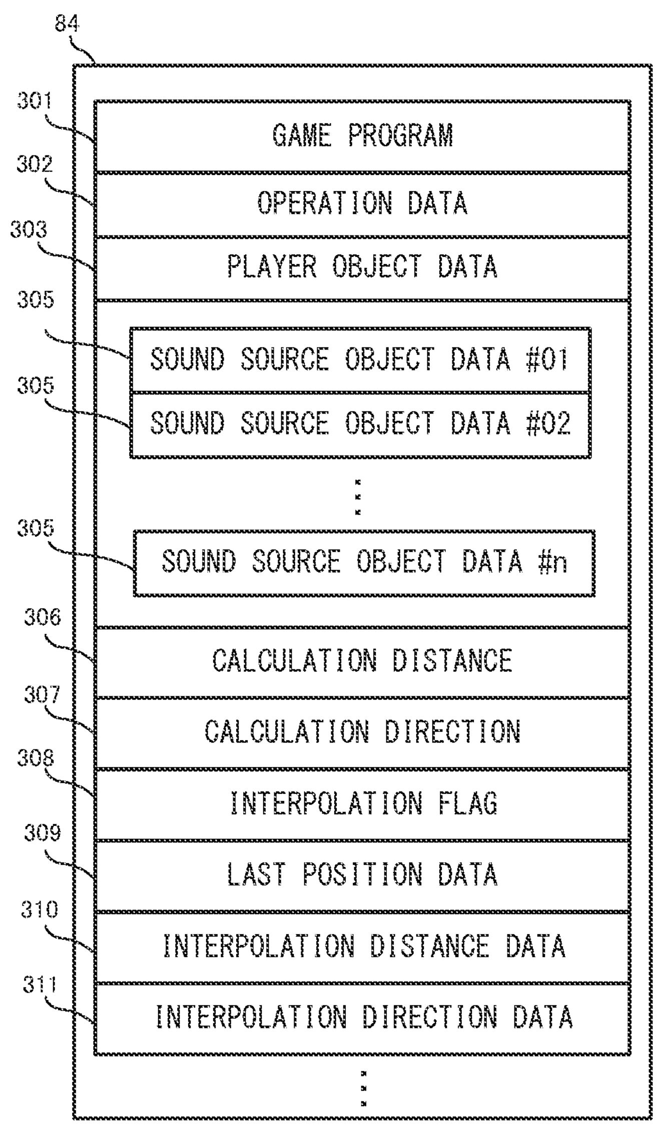
FIG. 8 is a memory map showing a non-limiting example of various data stored in a storage section 84 of the main body apparatus 2.

First, various data used in the process according to the exemplary embodiment will be described. FIG. 8 is a memory map showing an example of various data stored in the storage section 84 of the main body apparatus 2. The storage section 84 of the main body apparatus 2 stores a game program 301, operation data 302, player object data 303, sound source object data 305, a calculation distance 306, a calculation direction 307, an interpolation flag 308, last position data 309, interpolation distance data 310, interpolation direction data 311, and the like.

The game program 301 is a program for executing the game process according to the exemplary embodiment.

The operation data 302 is data obtained from the left controller 3 and the right controller 4, and indicates operations from a player. The operation data 302 includes data indicating the press states of various buttons provided to the controllers, data indicating operations on an analog stick, and the like.

The player object data 303 is data about the player object 101, and includes data indicating the outer appearance thereof, data indicating the present position of the player object in the virtual space, and the like.

Figure 9:
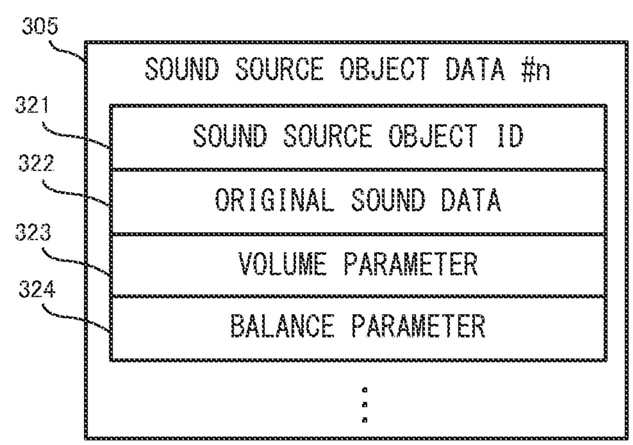
FIG. 9 shows a non-limiting example of the data structure of sound source object data 305.

The sound source object data 305 is data about the sound source 102. A plurality of sound source object data 305 corresponding to respective sound sources 102 are stored. In FIG. 8, each data is represented as sound source object data #n (n is an integer starting from 1). Each sound source object data 305 includes data as shown in FIG. 9. FIG. 9 shows an example of the data structure of each sound source object data 305. The sound source object data 305 includes a sound source object ID 321, original sound data 322, a volume parameter 323, a balance parameter 324, and the like. The sound source object ID 321 is an ID for uniquely identifying each sound source object. The original sound data 322 is data that defines a sound to be emitted by the sound source object. For example, if the sound source object is a "laundry machine", sound data sampled from an operation sound emitted from a laundry machine is stored. In other words, this sound can be considered to be a sound associated with the sound source object. The volume parameter 323 is a parameter indicating the volume of a sound emitted from the sound source object. The balance parameter 324 is a parameter indicating the left-right output balance between the left speaker 88L and the right speaker 88R, for the sound emitted from the sound source object. Besides, a sound quality parameter defining the quality of the sound emitted from the sound source object, data indicating the outer appearance of the sound source object, and the like (not shown) are also included in the sound source object data 305.

With reference to FIG. 8 again, the calculation distance 306 and the calculation direction 307 are parameters used for setting the volume of a sound to be outputted and the left-right output balance between the left speaker 88L and the right speaker 88R. Basically, the sound source distance from the player object 101 to the present position of the sound source 102 is the calculation distance 306, and the angle indicating the sound source direction from the player object 101 to the present position of the sound source 102 is the calculation direction 307. However, during the above interpolation period, the sound source distance and the sound source direction by the interpolations as described above are used.

The interpolation flag 308 is a flag for determining whether or not the present time is in the interpolation period, in processing described later. During the interpolation period, the interpolation flag 308 is set to ON. The initial value of the interpolation flag 308 is OFF.

The last position data 309 is data indicating the position of the player object 101 in the virtual space one frame ago.

The interpolation distance data 310 is data indicating the sound source distance at each frame during the above interpolation period. In the exemplary embodiment, the interpolation period is assumed to be a period of 10 frames, and therefore the interpolation distance data 310 includes a total of ten data indicating the sound source distances at the respective frames.

The interpolation direction data 311 is data indicating the sound source direction at each frame during the above interpolation period. As with the interpolation distance data 310, in the exemplary embodiment, a total of ten data indicating the sound source directions at the respective frames are included.

Besides, although not shown, various data needed for the game process, such as a parameter for controlling the virtual camera, are also stored in the storage section 84.

[Details of Process Executed by Processor 81]

Next, the details of the game process according to the exemplary embodiment will be described with reference to flowcharts shown in FIG. 10 and FIG. 11. In the following description, control for the sound source 102 (when the above instantaneous movement occurs) will be mainly described, and the detailed description of other game processes is omitted.

FIG. 10 is a flowchart showing the details of this game process. First, in step S1, the processor 81 performs operation control for the player object 101. Specifically, first, the processor 81 stores the present position coordinates of the player object 101 in the virtual space, as the last position data 309, in the storage section 84. Next, the processor 81 acquires the operation data 302. Further, the processor 81 determines what operation is indicated by the operation data 302. If the operation is an instruction to move the player object 101, the processor 81 performs control so as to move the player object 101 in the virtual space on the basis of the instruction. In addition, even if such a movement instruction is not performed, the processor 81 determines whether or not the player object 101 is located on the warp point. Then, if the player object 101 is located on the warp point, the processor 81 also performs processing of causing the player object 101 to "instantaneously move" to a predetermined position associated with the warp point in the virtual space. Then, the processor 81 places a virtual microphone at the position of the player object 101. That is, along with the movement control for the player object 101, the position of a virtual camera is also controlled.

Next, in step S2, the processor 81 determines whether or not the instantaneous movement has occurred. In the exemplary embodiment, if the position of the player object 101 at the present frame and the position thereof one frame ago indicated by the last position data 309 are away from each other by a predetermined threshold or greater, the processor 81 determines that the instantaneous movement has occurred. That is, whether or not the instantaneous movement has occurred is determined by determining whether or not movement exceeding the predetermined threshold has occurred in one frame. The time "one frame ago" is merely an example, and the determination may be performed with reference to the position several frames ago. As a result of the determination, if the instantaneous movement has not occurred (NO in step S2), the process proceeds to step S4. On the other hand, if the instantaneous movement has occurred (YES in step S2), in step S3, the processor 81 executes the interpolation process. This process is a process for performing interpolation for the sound source distance and the sound source direction from the position before the instantaneous movement to the position after the instantaneous movement as described above.

Figure 11:
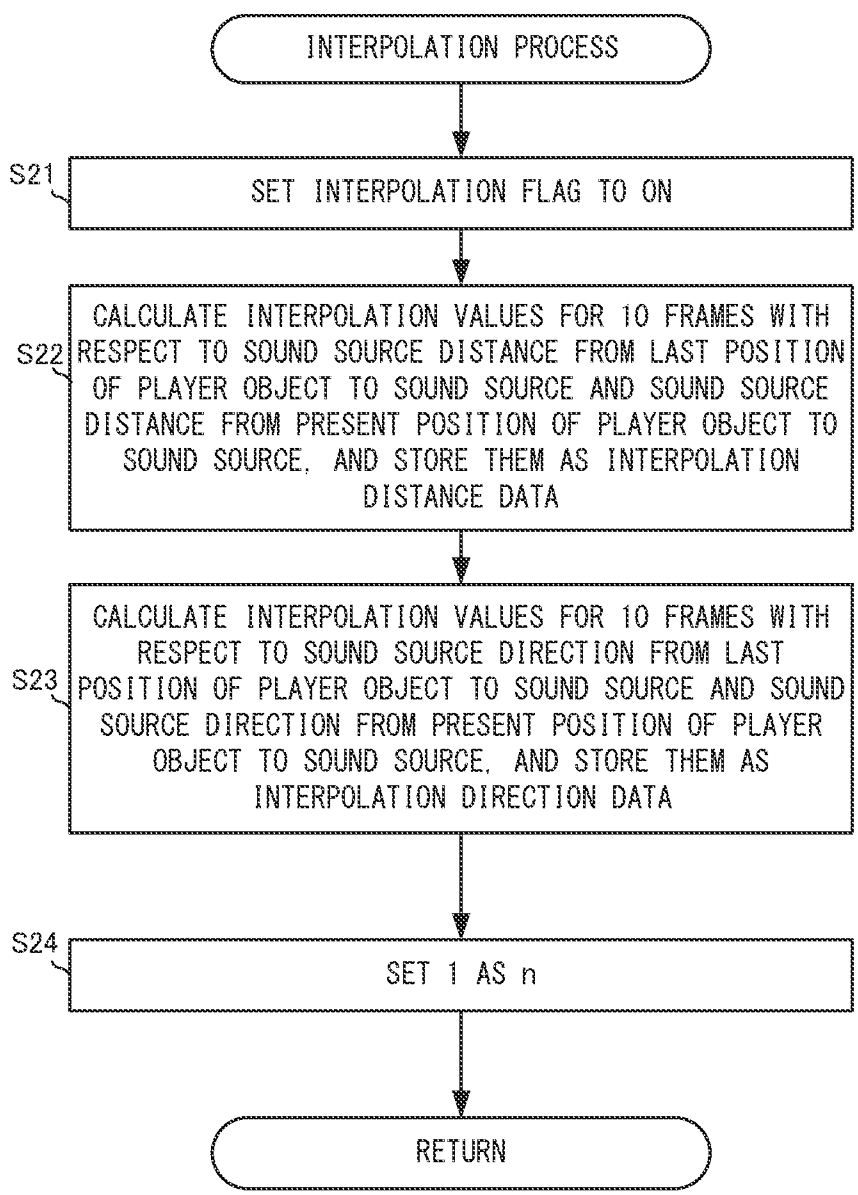
FIG. 11 is a non-limiting example of a flowchart showing the details of an interpolation process.

FIG. 11 is a flowchart showing the details of the interpolation process. In FIG. 11, first, in step S21, the processor 81 sets the interpolation flag 308 to ON.

Next, in step S22, the processor 81 performs the first interpolation described above. Specifically, the processor 81 refers to the last position data 309, to calculate interpolation values for the frames during the interpolation period, with respect to the sound source distance (hereinafter, last distance) between the player object 101 one frame ago and the sound source 102, and the sound source distance (hereinafter, present distance) between the player object 101 at the present and the sound source 102. In the exemplary embodiment, the interpolation values for 10 frames are calculated so that the last distance gradually becomes close to the present distance. The method for calculating the interpolation values may be any method. For example, in the case of FIG. 6 and FIG. 7, distances as the interpolation values may be calculated through linear interpolation between the last distance (in this example, 10) and the present distance (in this example, 2). Then, the processor 81 stores, as the interpolation distance data 310, the interpolation values for 10 frames calculated as described above.

Next, in step S23, the processor 81 performs the second interpolation described above. Specifically, the processor 81 refers to the last position data 309, to calculate interpolation values for the frames during the interpolation period, with respect to the sound source direction (hereinafter, last direction) between the player object 101 one frame ago and the sound source 102, and the sound source direction (hereinafter, present direction) between the player object 101 at the present and the sound source 102. In the exemplary embodiment, the interpolation values for 10 frames are calculated so that the last direction (angle thereof) gradually becomes close to the present direction (angle thereof). In the example shown in FIG. 6 and FIG. 7, angles as the interpolation values may be calculated through linear interpolation between the last direction (in this example, 20°) and the present direction (in this example, 200°). Then, the processor 81 stores, as the interpolation direction data 311, the interpolation values for 10 frames calculated as described above.

Next, in step S24, the processor 81 sets 1 as a variable n used in processing described later. The variable n is a variable for indicating a number of each frame (what frame number) during the interpolation period. In the exemplary embodiment, since the interpolation period is 10 frames, values that can be taken by the variable are also 1 to 10. The interpolation process is as described above.

With reference to FIG. 10 again, next, in step S4, the processor 81 refers to the interpolation flag 308, to determine whether or not the present time is in the interpolation period. As a result of the determination, if the present time is not in the interpolation period (NO in step S4), in step S5, the processor 81 calculates the sound source distance from the present position of the player object 101 to the sound source 102, and stores the calculated sound source distance as the calculation distance 306 in the storage section 84.

Further, in step S6, the processor 81 calculates the sound source direction to the sound source 102 as seen from the present position of the player object 101, and stores the calculated sound source direction as the calculation direction 307 in the storage section 84.

Next, in step S7, the processor 81 sets the volume parameter 323 and the balance parameter 324 corresponding to a game sound which is an actual sound to be outputted, on the basis of the calculation distance 306 and the calculation direction 307.

Next, in step S8, the processor 81 generates the game sound on the basis of the above setting. In addition, the processor 81 generates a game image which is an image reflecting results of various game processes other than the above process, at the present frame. More specifically, the processor 81 sets the position, the direction, and the angle of view of the virtual camera on the basis of movement of the player object 101 (for example, performs control so that the virtual camera follows the player object 101). In addition, the processor 81 sets the look-at point of the virtual camera at the position of the player object 101. Further, the processor 81 images, by the virtual camera, a virtual space in which results of various game processes other than the above process are reflected, to generate a game image. Then, the processor 81 outputs the generated game sound and game image. Thereafter, the process returns to step S1, and is repeated.

Next, a case where the present time is in the interpolation period as a result of the determination in step S4 (YES in step S4) will be described. In this case, first, in step S9, the processor 81 refers to the interpolation distance data 310, to acquire the value of the interpolation distance corresponding to the nth frame during the interpolation period. Then, the processor 81 stores this value of the interpolation distance as the calculation distance 306 in the storage section 84.

Next, in step S10, the processor 81 refers to the interpolation direction data 311, to acquire the value (angle) of the interpolation direction corresponding to the nth frame during the interpolation period. Then, the processor 81 stores this value of the interpolation direction as the calculation direction 307 in the storage section 84.

Next, in step S11, the processor 81 adds 1 to the variable n.

Next, in step S12, the processor 81 determines whether or not the variable n is equal to or greater than 10, thereby determining whether or not 10 frames have elapsed since the start of the interpolation period. That is, the processor 81 determines whether or not the interpolation period has ended. As a result of the determination, if 10 frames have elapsed (YES in step S12), in step S13, the processor 81 sets the interpolation flag 308 to OFF. Then, the processor 81 advances the process to step S7. On the other hand, if 10 frames have not elapsed yet (NO in step S12), the processor 81 advances the process to step S7 without performing the processing in step S13. Thus, during the interpolation period, sound output control based on the interpolation positions as shown in FIG. 7 is performed.

Thus, the detailed description of the game process according to the exemplary embodiment has been finished.

As described above, in the exemplary embodiment, in a case where the positional relationship between the player object 101 (virtual microphone) and the sound source 102 has sharply changed as in the instantaneous movement, interpolation is performed so that each of the sound source distance from the player object 101 to the sound source 102 and the sound source direction in which the sound source 102 is present as seen from the player object 101 changes over a predetermined period from a point before the change to a point after the change. Then, after the sharp change has occurred, during the predetermined period, the volume of a sound to be outputted and the output balance of the speakers are set on the basis of the above interpolation. Thus, even if the positional relationship between the sound source 102 and the virtual microphone sharply changes while a sound is being outputted, sharp change in output of the sound is relaxed, whereby an auditory strange feeling given to the user can be reduced.

[Modifications]

The above exemplary embodiment has shown the example in which interpolation values are calculated for 10 frames which are an example of the interpolation period, and the interpolation values for the respective frames are stored in the storage section 84. In another exemplary embodiment, only a change amount per frame during the interpolation period may be calculated and stored, and in the processing in steps S9 and S10, instead of acquiring the interpolation distance and the interpolation direction from the storage section 84, the calculation distance 306 and the calculation direction 307 for each frame during the interpolation period may be calculated on the basis of the change amount. In still another exemplary embodiment, instead of performing the interpolation process shown in step S3 when the instantaneous movement has occurred, the interpolation distance and the interpolation direction may be calculated in processing at each of the frames during the interpolation period (for example, the interpolation distance and the interpolation direction may be calculated in the processing in steps S9 and S10).

Regarding a trigger for performing the instantaneous movement, the above exemplary embodiment has shown the example in which the instantaneous movement is performed merely by the player object being placed on the warp point. Without limitation to such a configuration, in another exemplary embodiment, another operation for performing the instantaneous movement may be required. For example, the instantaneous movement may be performed when a predetermined operation is performed in a state in which the player object is on the warp point. Alternatively, such an object that another object cannot be placed thereon like the warp point may be used as an object equivalent to the warp point. In this case, the instantaneous movement may be performed in response to the fact that a predetermined operation is performed in a state of being close to the above object.

The above exemplary embodiment has shown the example in which the player object 101 performs the instantaneous movement. Alternatively, the above-described process is applicable also to a case where the sound source 102 instead of the player object 101 moves a predetermined distance or longer in a predetermined unit time (e.g., 1 frame). This is because such a case can also be considered to be a situation in which the relative positional relationship between the player object 101 and the sound source 102 sharply changes.

The above exemplary embodiment has shown the example in which there are two speakers (stereo speakers) for outputting sounds. Without limitation thereto, a case of having three or more speakers, e.g., surround speakers, is also applicable. Also in this case, during the interpolation period, the volumes of the respective speakers and the output balance among them may be set on the basis of the sound source distance and the sound source direction interpolated as described above.

The above exemplary embodiment has shown application to the game process in the game system, as an example. However, without limitation to the game process, the above-described process is applicable to general information processes for performing sound control in a virtual three-dimensional space. For example, the above-described process is applicable also to a VR content or the like not having game property.

The above exemplary embodiment has shown the case where a series of processing steps in the game process is executed by a single apparatus. However, in another exemplary embodiment, the above series of processing steps may be executed by an information processing system including a plurality of information processing apparatuses. For example, in an information processing system including a terminal-side apparatus and a server-side apparatus capable of communicating with the terminal-side apparatus via a network, a part of the above series of processing steps may be executed by the server-side apparatus. Further, in an information processing system including a terminal-side apparatus and a server-side apparatus capable of communicating with the terminal-side apparatus via a network, major processing of the above series of processing steps may be executed by the server-side apparatus, and a part of the above series of processing steps may be executed by the terminal-side apparatus. In addition, in the above information processing system, a server-side system may be composed of a plurality of information processing apparatuses and processing to be executed on the server side may be executed by the plurality of information processing apparatuses in a shared manner.

While the exemplary embodiments have been described herein, it is to be understood that the above description is, in all aspects, merely an illustrative example, and is not intended to limit the scope thereof. It is to be understood that various modifications and variations can be made without deviating from the scope of the exemplary embodiments.

What is claimed is:

1. A non-transitory computer-readable storage medium having stored therein an information processing program to be executed by a computer of an information processing apparatus capable of outputting a sound to a plurality of speakers, the program causing the computer to:
- control a position of a virtual microphone in a virtual space where a virtual sound source associated with a sound is placed;
- perform volume setting for the sound to be outputted and balance setting for an output balance of the plurality of speakers, on the basis of a relative distance and a relative direction from the virtual microphone to the virtual sound source;
- output the sound to the plurality of speakers on the basis of the set volume and the set output balance; and
- in a case where the virtual microphone has moved to an extent greater than a predetermined reference in the virtual space, during a predetermined period from the movement of the virtual microphone,
  - perform each of first interpolation for changing the relative distance over the predetermined period, from the relative distance before the movement to the relative distance after the movement, and second interpolation for changing the relative direction over the predetermined period, from the relative direction before the movement to the relative direction after the movement, and
  - perform the volume setting and the balance setting on the basis of the relative distance set through the first interpolation and the relative direction set through the second interpolation.

2. The non-transitory computer-readable storage medium according to claim 1, wherein
- the first interpolation and the second interpolation are linear interpolations.

3. The non-transitory computer-readable storage medium according to claim 1, wherein
- the predetermined reference is that a movement distance in a unit time reaches a predetermined distance in the virtual space.

4. The non-transitory computer-readable storage medium according to claim 1, the program further causing the computer to:
- control a virtual camera on the basis of an operation input; and
- control a position of the virtual microphone on the basis of a position of a look-at point of the virtual camera.

5. The non-transitory computer-readable storage medium according to claim 4, the program further causing the computer to:
- control a player character object on the basis of the operation input;
- control the look-at point of the virtual camera on the basis of a position of the player character object; and
- when the player character object is at a position where a first object is placed in the virtual space, move the player character object to a position of a second object placed in the virtual space, on the basis of the operation input.

6. A processing apparatus capable of outputting a sound to a plurality of speakers, the processing apparatus comprising:
- a processor and a memory coupled thereto, the processor being configured to control the processing apparatus to at least:
- control a position of a virtual microphone in a virtual space where a virtual sound source associated with a sound is placed;
- perform volume setting for the sound to be outputted and balance setting for an output balance of the plurality of speakers, on the basis of a relative distance and a relative direction from the virtual microphone to the virtual sound source;
- output the sound to the plurality of speakers on the basis of the set volume and the set output balance; and
- in performing the volume setting and the balance setting, in a case where the virtual microphone has moved to an extent greater than a predetermined reference in the virtual space, during a predetermined period from the movement of the virtual microphone,
  - perform each of first interpolation for changing the relative distance over the predetermined period, from the relative distance before the movement to the relative distance after the movement, and second interpolation for changing the relative direction over the predetermined period, from the relative direction before the movement to the relative direction after the movement, and
  - perform the volume setting and the balance setting on the basis of the relative distance set through the first interpolation and the relative direction set through the second interpolation.

7. The processing apparatus according to claim 6, wherein the first interpolation and the second interpolation are linear interpolations.

8. The processing apparatus according to claim 6, wherein the predetermined reference is that a movement distance in a unit time reaches a predetermined distance in the virtual space.

9. The processing apparatus according to claim 6, the processor further causing the processing apparatus to:

control a virtual camera on the basis of an operation input; and control a position of the virtual microphone on the basis of a position of a look-at point of the virtual camera.

10. The processing apparatus according to claim 9, the processor further causing the processing apparatus to:

control a player character object on the basis of the operation input;

control the look-at point of the virtual camera on the basis of a position of the player character object; and when the player character object is at a position where a first object is placed in the virtual space, move the player character object to a position of a second object placed in the virtual space, on the basis of the operation input.

11. A processing system capable of outputting a sound to a plurality of speakers, the processing system comprising:

a processor and a memory coupled thereto, the processor being configured to control the processing system to at least:

control a position of a virtual microphone in a virtual space where a virtual sound source associated with a sound is placed;

perform volume setting for the sound to be outputted and balance setting for an output balance of the plurality of speakers, on the basis of a relative distance and a relative direction from the virtual microphone to the virtual sound source;

output the sound to the plurality of speakers on the basis of the set volume and the set output balance; and in performing the volume setting and the balance setting, in a case where the virtual microphone has moved to an extent greater than a predetermined reference in the virtual space, during a predetermined period from the movement of the virtual microphone, perform each of first interpolation for changing the relative distance over the predetermined period, from the relative distance before the movement to the relative distance after the movement, and second interpolation for changing the relative direction over the predetermined period, from the relative direction before the movement to the relative direction after the movement, and perform the volume setting and the balance setting on the basis of the relative distance set through the first interpolation and the relative direction set through the second interpolation.

12. The processing system according to claim 11, wherein the first interpolation and the second interpolation are linear interpolations.

13. The processing system according to claim 11, wherein the predetermined reference is that a movement distance in a unit time reaches a predetermined distance in the virtual space.

14. The processing system according to claim 11, the processor further causing the processing system to:

control a virtual camera on the basis of an operation input; and control a position of the virtual microphone on the basis of a position of a look-at point of the virtual camera.

15. The processing system according to claim 14, the processor further causing the processing system to:

control a player character object on the basis of the operation input;

control the look-at point of the virtual camera on the basis of a position of the player character object; and when the player character object is at a position where a first object is placed in the virtual space, move the player character object to a position of a second object placed in the virtual space, on the basis of the operation input.

16. An information processing method to be performed by a processor of a processing apparatus capable of outputting a sound to a plurality of speakers, the method comprising:

controlling a position of a virtual microphone in a virtual space where a virtual sound source associated with a sound is placed;

performing volume setting for the sound to be outputted and balance setting for an output balance of the plurality of speakers, on the basis of a relative distance and a relative direction from the virtual microphone to the virtual sound source;

outputting the sound to the plurality of speakers on the basis of the set volume and the set output balance; and in a case where the virtual microphone has moved to an extent greater than a predetermined reference in the virtual space, during a predetermined period from the movement of the virtual microphone, performing each of first interpolation for changing the relative distance over the predetermined period, from the relative distance before the movement to the relative distance after the movement, and second interpolation for changing the relative direction over the predetermined period, from the relative direction before the movement to the relative direction after the movement, and performing the volume setting and the balance setting on the basis of the relative distance set through the first interpolation and the relative direction set through the second interpolation.

17. The information processing method according to claim 16, wherein the first interpolation and the second interpolation are linear interpolations.

18. The information processing method according to claim 16, wherein the predetermined reference is that a movement distance in a unit time reaches a predetermined distance in the virtual space.

19. The information processing method according to claim 16, further comprising:

controlling a virtual camera on the basis of an operation input; and controlling a position of the virtual microphone on the basis of a position of a look-at point of the virtual camera.

20. The information processing method according to claim 19, further comprising:

controlling a player character object on the basis of the operation input;

controlling the look-at point of the virtual camera on the basis of a position of the player character object; and when the player character object is at a position where a first object is placed in the virtual space, moving the player character object to a position of a second object placed in the virtual space, on the basis of the operation input.

* * * * *